(12) United States Patent
Guo et al.

(10) Patent No.: US 8,203,308 B1
(45) Date of Patent: Jun. 19, 2012

(54) METHOD AND CIRCUIT FOR PROVIDING A BALANCING CURRENT IN A CHARGE CIRCUIT INTERRUPT DEVICE

(75) Inventors: Sam Y. Guo, Canton, MI (US);
Yongmin Sheng, Novi, MI (US);
Xiaopeng Wang, Canton, MI (US)

(73) Assignee: Yazaki North America, Inc., Canton, MI (US)

( * ) Notice: Subject to any disclaimer, the term of this patent is extended or adjusted under 35 U.S.C. 154(b) by 439 days.

(21) Appl. No.: 12/426,525

(22) Filed: Apr. 20, 2009

(51) Int. Cl.
*H02J 7/00* (2006.01)
(52) U.S. Cl. .......................... 320/119; 361/42; 361/101
(58) Field of Classification Search .................. 320/119; 361/78, 79, 83, 87, 93.1, 93.7, 93.9, 94, 100, 361/101, 57, 93, 45
See application file for complete search history.

(56) References Cited

U.S. PATENT DOCUMENTS

| | | | | |
|---|---|---|---|---|
| 4,029,996 A | * | 6/1977 | Miffitt | 307/326 |
| 4,080,640 A | | 3/1978 | Elms et al. | |
| 4,138,707 A | | 2/1979 | Gross | |
| 5,270,897 A | * | 12/1993 | McDonald et al. | 361/45 |
| 7,265,959 B2 | | 9/2007 | Guo | |
| 7,443,049 B1 | | 10/2008 | Jones et al. | |
| 7,852,090 B2 | * | 12/2010 | Lenzie et al. | 324/508 |
| 2004/0136125 A1 | * | 7/2004 | Nemir et al. | 361/42 |
| 2009/0323239 A1 | * | 12/2009 | Markyvech | 361/57 |

OTHER PUBLICATIONS

Rawson, Mark et al., Electric Vehicle Charging Equipment Design and Health and Safety Codes, California Energy Commission, Aug. 31, 1998, 12 pages.
Fairchild Semiconductor, RV4145A—Low Power Ground Fault Interrupter, www.fairchildsemi.com, Rev. 1.0.3, Mar. 6, 2002, 11 pages.

* cited by examiner

*Primary Examiner* — Huy Q Phan
*Assistant Examiner* — Temilade S Rhodes-Vivour
(74) *Attorney, Agent, or Firm* — Harness, Dickey & Pierce, P.L.C.

(57) ABSTRACT

A charge circuit interrupt device comprises a ground fault interrupt module, a current generation module and a current injection module. The ground fault interrupt module disconnects a load from a charging source when a current imbalance exceeds a threshold. The current generation module generates a balancing current based on the current imbalance. The current injection module inputs the balancing current into the charging source to oppose the current imbalance. The charge circuit interrupt device may further include an input balance disable control module that disables the current generation module from generating the balancing current when the current imbalance exceeds the threshold, and a current isolation module that isolates the charging source and the ground fault interrupt module, the current generation module and the current injection module.

9 Claims, 9 Drawing Sheets

METHOD AND CIRCUIT FOR PROVIDING A BALANCING CURRENT IN A CHARGE CIRCUIT INTERRUPT DEVICE

FIELD

The present disclosure relates to a system and method for providing a charge to an electric vehicle and, more particularly, to a method and device for providing a balancing current to a Ground Fault Interrupter such that a Charge Circuit Interrupt Device can control the charging current provided to the electric vehicle.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

There is a growing market in the automotive field for electric and hybrid-electric vehicles, and specifically "plug-in" vehicles that include batteries that may be recharged from ordinary household electrical circuits. These plug-in electric vehicles are designed to operate primarily on battery power, thus reducing the quantity of emissions (such as greenhouse gases) from the vehicle.

One of the issues associated with plug-in electric vehicles is providing a charge to the vehicle's batteries. Typically, an electric cable is utilized to connect the electric vehicle charging circuitry to household electrical power. In order to provide a degree of shock protection, the electric cable may be provided with an integrated ground fault interruption feature, which is commonly referred to as a Charge Circuit Interrupt Device ("CCID"). The CCID will act similarly to a Ground Fault Interrupter and disconnect electrical power (or "trip") when a current imbalance between a hot line and a neutral line is sensed.

A typical CCID will have a tripping current threshold of 20 mA, which means that a current imbalance in excess of 20 mA will initiate the CCID to disconnect power. In contrast, a typical household outlet Ground Fault Interrupter ("GFI") will have a tripping current threshold of 5 mA. Thus, a CCID that is plugged into a household outlet with GFI protection will be disconnected from electrical power at imbalance currents in excess of 5 mA but below the CCID threshold level of 20 mA. Such current imbalances and the associated disconnection may be referred to as "nuisance trippings," as power is disconnected from the electric vehicle unnecessarily. It would be desirable to provide a CCID that reduces or eliminates nuisance trippings.

SUMMARY

In accordance with various embodiments of the present disclosure, a charge circuit interrupt device comprises a ground fault interrupt module, a current generation module and a current injection module. The ground fault interrupt module disconnects a load from a charging source when a current imbalance exceeds a threshold. The current generation module generates a balancing current based on the current imbalance. The current injection module inputs the balancing current into the charging source to oppose the current imbalance.

In accordance with various embodiments of the present disclosure, the charge circuit interrupt device may further include an input balance disable control module that disables the current generation module from generating the balancing current when the current imbalance exceeds the threshold. A current isolation module that isolates the charging source and the ground fault interrupt module, the current generation module and the current injection module may also be included in the charge circuit interrupt device.

In accordance with various embodiments of the present disclosure, a method for providing a charge to a rechargeable load from a charging source is disclosed. The method includes sensing a current imbalance, generating a balancing current based on the current imbalance, inputting the balancing current into the charging source to oppose the current imbalance, and disconnecting the load from the charging source when the current imbalance exceeds a threshold.

In accordance with various embodiments of the present disclosure, the method may include ceasing to generate the balancing current when the current imbalance exceeds the threshold. In accordance with various embodiments of the present disclosure, the method may also include delaying the ceasing to generate the balancing current when the current imbalance exceeds the threshold. In accordance with various embodiments of the present disclosure, the method may further include isolating the charging source and circuitry that generates the balancing current based on the current imbalance Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

The present disclosure will become more fully understood from the detailed description and the accompanying drawings, wherein.

DESCRIPTION

Figure 1:
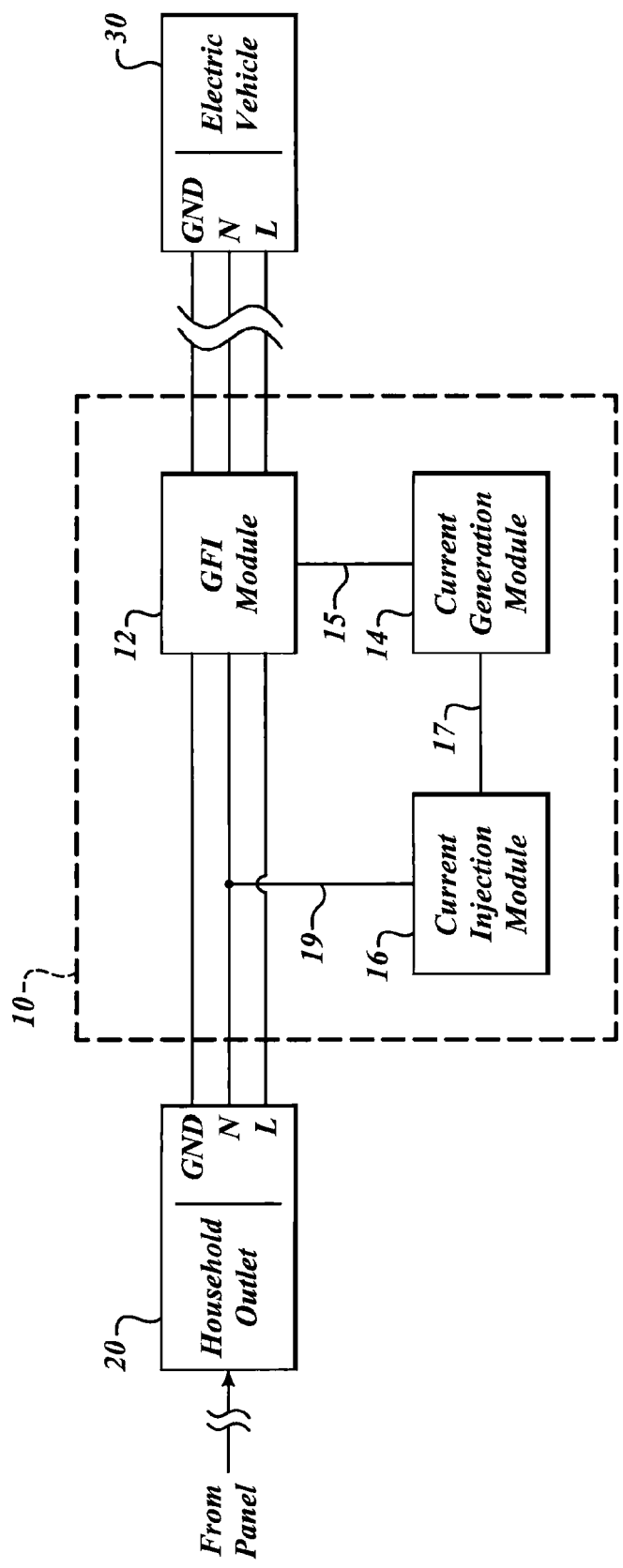
FIG. 1 is a schematic block diagram of a device for providing a balancing current from a Charge Circuit Interrupt Device ("CCID") to a Ground Fault Interrupter ("GFI") to reduce GFI nuisance tripping according to various embodiments of the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

A device for providing a balancing current from a Charge Circuit Interrupt Device ("CCID") to a Ground Fault Interrupter ("GFI") to reduce GFI nuisance tripping according to various embodiments of the present disclosure is illustrated in FIG. 1. The device 10 includes a GFI module 12, a current generation module 14 and a current injection module 16. The device 10 is utilized to connect a charging source, such as an ordinary household grounded outlet 20, to a device to be charged, e.g., an electric vehicle 30.

The GFI module 12 operates to disconnect the electric vehicle 30 from the household outlet 20 in the event that a current imbalance between the Neutral ("N") line and hot ("L") line exceeds a threshold, for example only, 20 mA. As described above, however, a typical household outlet 20 may include a Ground Fault Interrupter that trips at a lower current imbalance threshold, such as 5 mA. Thus, if the current imbalance sensed by the household outlet 20 is not adjusted or balanced, the GFI of the household outlet 20 will render the GFI module 12 of the CCID 10 superfluous and the charging of the electric vehicle 30 will be interrupted under typical operating conditions of the CCID 10 ("nuisance tripping").

Current generation module 14 and current injection module 16 operate to compensate for and balance the current imbalance sensed by the household outlet 20 in order to reduce or eliminate nuisance tripping. Current generation module 14 receives an imbalance signal 15 from the GFI module 12 that is indicative of the imbalance between the N and L lines. In response to this imbalance signal, current generation module 14 generates a balance current signal 17 that is received by current injection module 16. In various embodiments, balance current signal 17 may be a current signal that has the same magnitude as the current imbalance sensed by GFI module 12 but the opposite direction. In various embodiments, balance current signal 17 may be a current signal that has a magnitude that, when combined with the current imbalance in the opposite direction, as described more fully below, reduces the current imbalance sensed by the household outlet 20 below its tripping threshold, e.g., 5 mA.

Current injection module 16 injects a balancing current 19 into the household outlet 20 based on the balance current signal 17. In various embodiments, the balancing current 19 is input on the N line. The balancing current 19 is injected into household outlet 20, e.g., on the N line, such that the current imbalance sensed by the household outlet 20 is reduced below its GFI threshold. This may be accomplished by determining the balancing current 19 based on the following equation:

$$|I_L + I_N| < I_{threshold},$$

where $I_L$ is the current on the L line, $I_N$ is the balancing current 19, and $I_{threshold}$ is the current imbalance threshold of the GFI for the household outlet 20, typically 5 mA.

In operation, the CCID 10 illustrated in FIG. 1 operates such that the GFI of the household outlet 20 will not detect a current imbalance in excess of its threshold and, thus, will not disconnect power from GFI module 12. This is accomplished by injecting balancing current 19 into the household outlet 20 to reduce the current imbalance. As described above, GFI module 12 will operate to disconnect power or "trip" when the actual current imbalance (independent of the balancing current 19) exceeds the GFI module 12 threshold, which is higher than the threshold of household outlet 20.

Figure 2A:
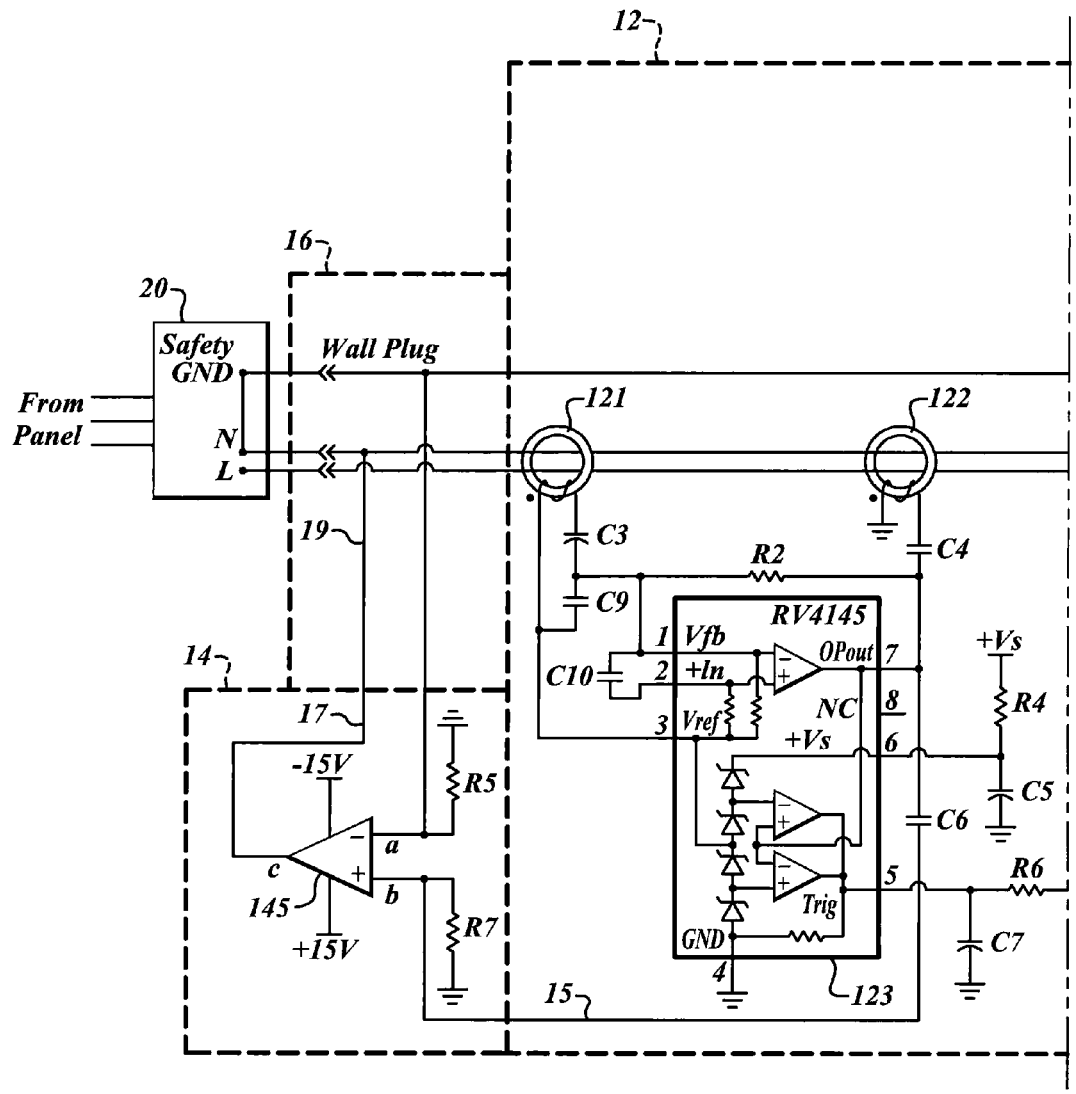
FIGS. 2A-2B illustrate a circuit diagram of an exemplary device for providing a balancing current from a CCID to a GFI to reduce GFI nuisance tripping according to various embodiments of the present disclosure.
Figure 2B:
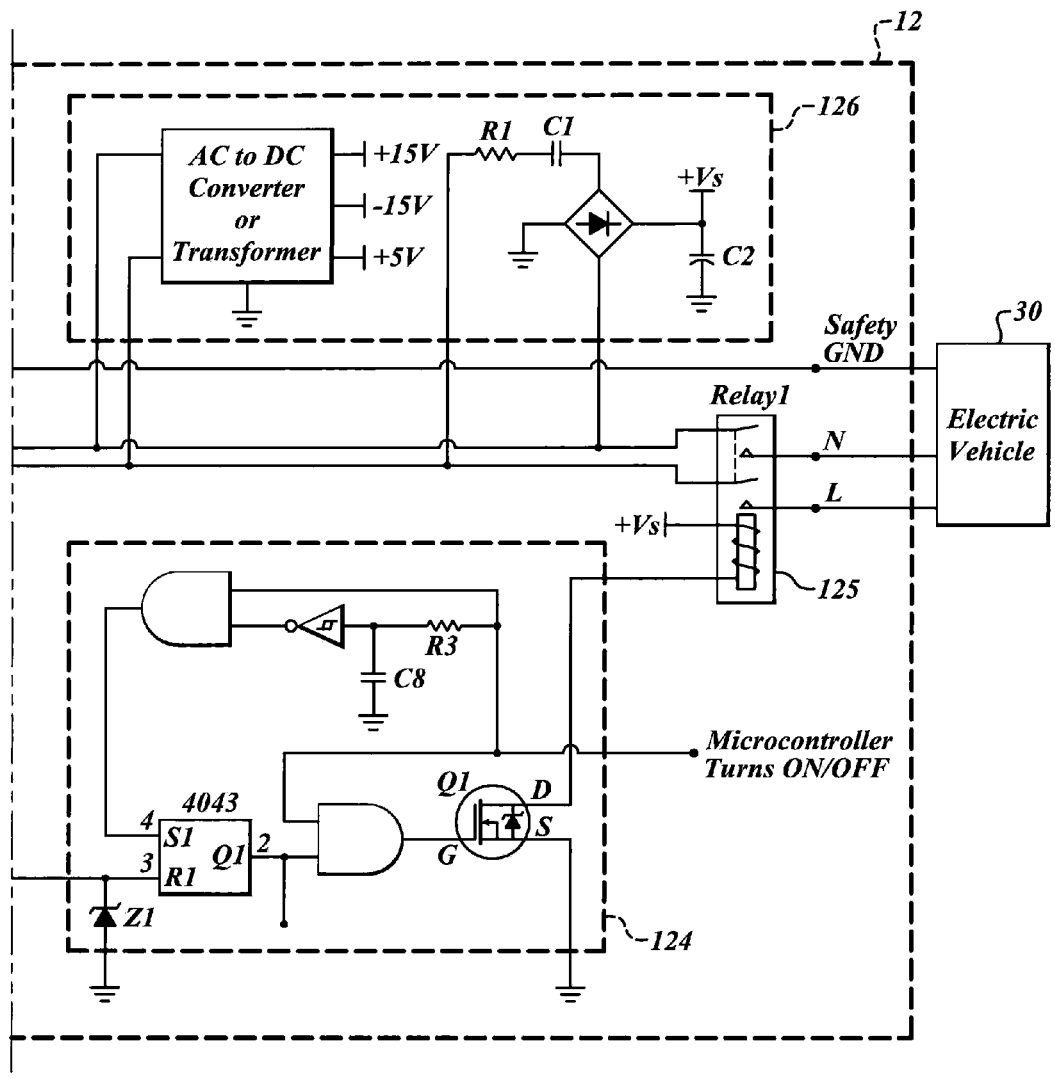

A circuit diagram of an exemplary device 10A for providing a balancing current from a CCID to a GFI to reduce GFI nuisance tripping according to various embodiments of the present disclosure is illustrated in FIG. 2. The device 10A includes a GFI module 12, a current generation module 14 and a current injection module 16. The device 10A is utilized to connect an ordinary household grounded outlet 20 to a device to be charged, e.g., an electric vehicle 30.

The GFI module 12 includes two transformers 121, 122 that are utilized to sense a current imbalance between the L and N lines. The two transformers 121, 122 are connected, through various resistors and capacitors, to a low power ground fault interrupter 123, such as the RV4145 integrated circuit ("IC") illustrated in FIG. 2. One output of the RV4145 IC 123 is the silicon-controlled rectifier ("SCR") trigger, which is output to an SCR device 124. The SCR device 124 is connected to a relay 125 that disconnects power from the device to be charged (electric vehicle 30) when triggered. Another output of the low power ground fault interrupter 123 is the imbalance signal 15, which may be the op-amp output from the RV4145 IC as illustrated. GFI module 12 also includes a power supply module 126 for providing direct current ("DC") power to the various electrical components of the GFI module 12, such as low power ground fault interrupter 123 and SCR device 124.

The current generation module 14 receives the imbalance signal 15 from the GFI module 12. The illustrated current generation module 14 includes a comparator 145 that receives the imbalance signal 15 and ground signal GND as inputs. Comparator 145 outputs the balance current signal 17, which is utilized by current injection module 16. In the illustrated example, current injection module 16 injects the balance current signal 17 as the balancing current 19 into the N line of the household outlet 20, as described above.

Figure 3A:
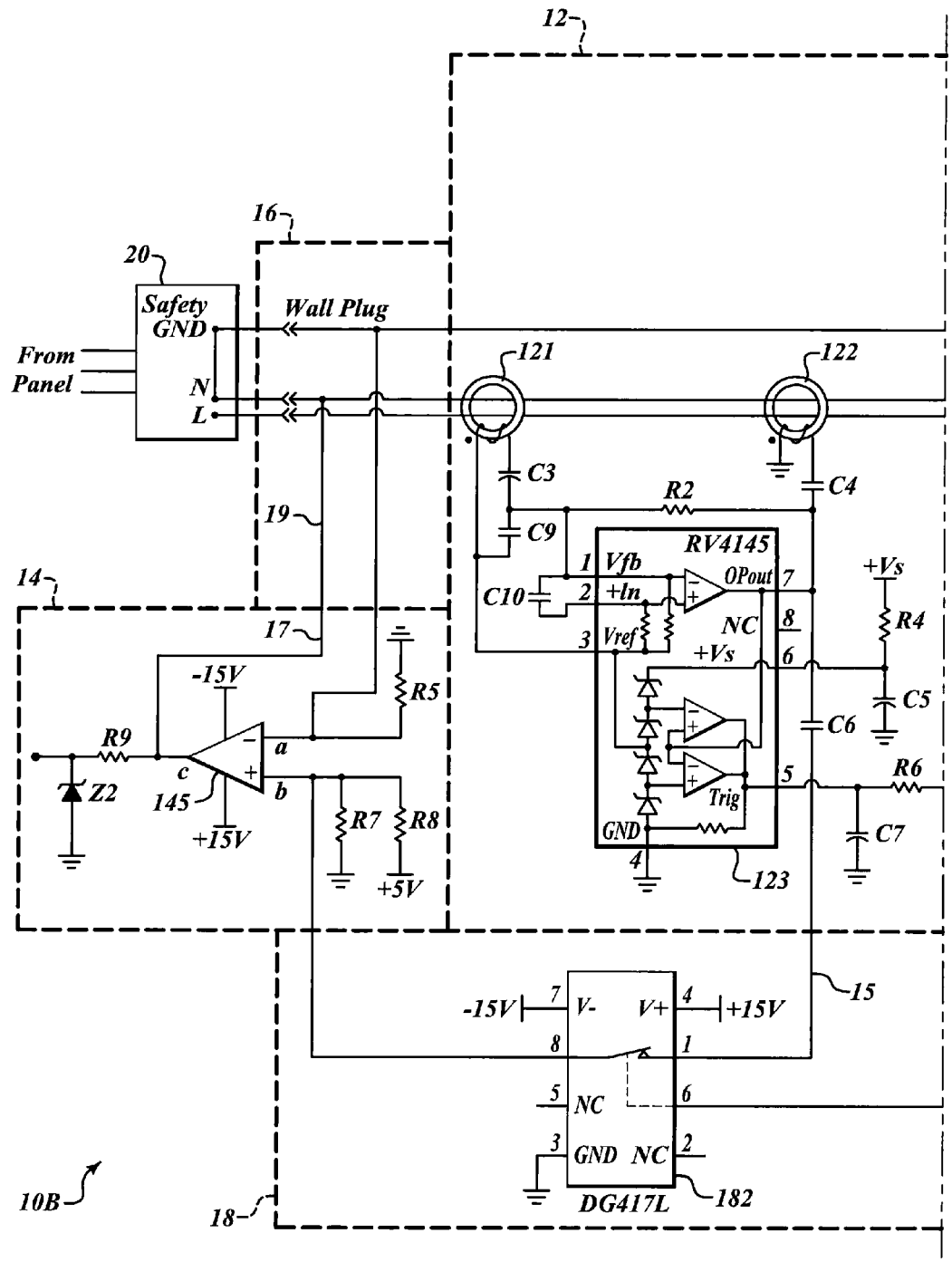
FIGS. 3A-3B illustrate a circuit diagram of an exemplary device for providing a balancing current from a CCID to a GFI to reduce GFI nuisance tripping according to various embodiments of the present disclosure.
Figure 3B:
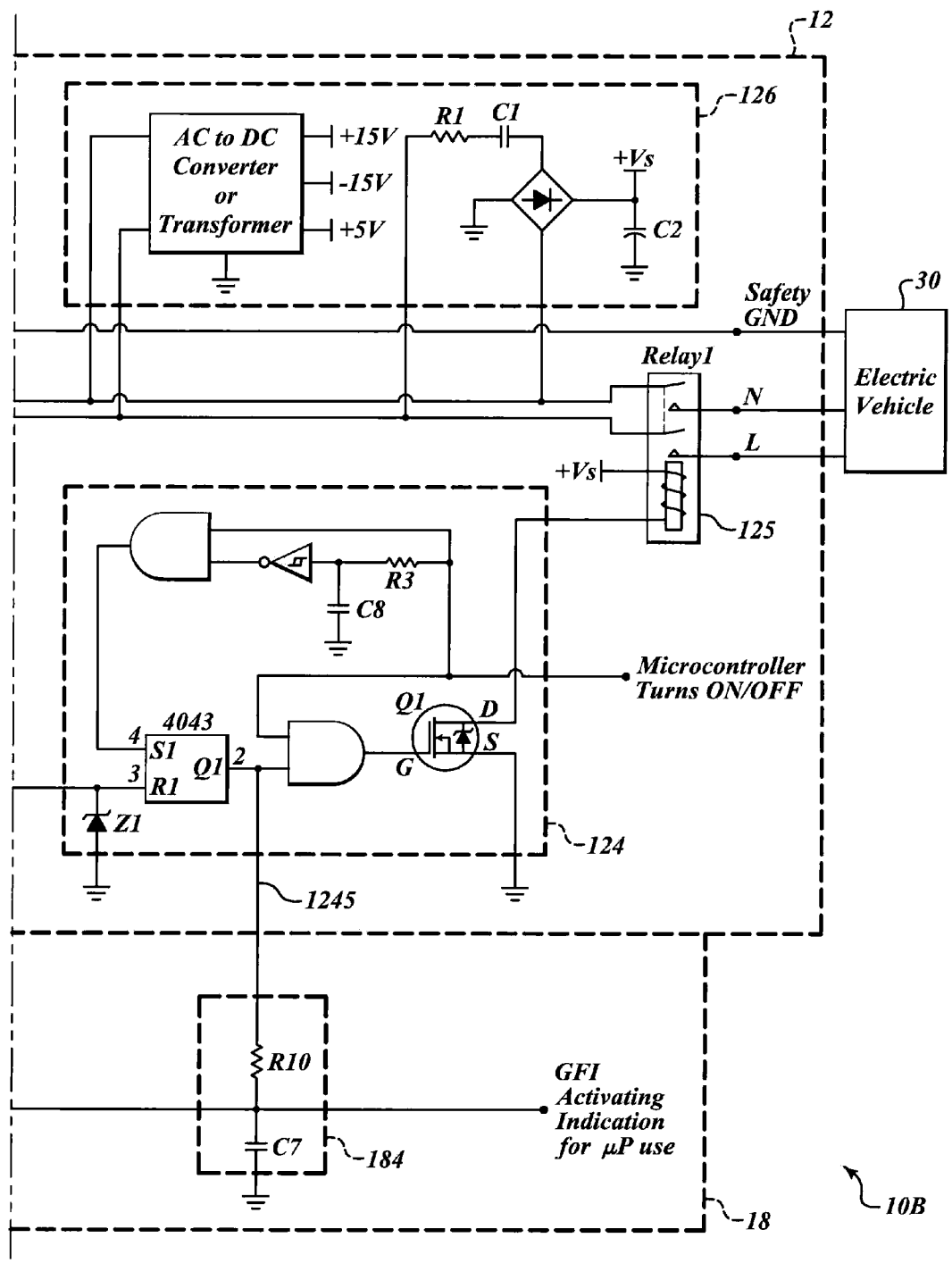

Referring now to FIG. 3, a circuit diagram of yet another exemplary device 10B for providing a balancing current from a CCID to a GFI to reduce GFI nuisance tripping according to various embodiments of the present disclosure is illustrated. The device 10B is utilized to connect an ordinary household grounded outlet 20 to a device to be charged, e.g., an electric vehicle 30. Similar to device 10A described above, the device 10B includes a GFI module 12, a current generation module 14 and a current injection module 16. Device 10B further includes an input balance disable control module 18. Input balance disable control module 18 is included as a failsafe protection in the event that GFI module 12 fails to disconnect power when a current imbalance exceeds the GFI module 12 threshold, for example, because relay 125 becomes stuck or inoperative.

Input balance disable control module 18 receives a trip signal 1245 from SCR device 124. Trip signal 1245 is indicative of a condition in which SCR device 124 has been triggered to trip relay 125 to disconnect power from electric vehicle 30. Input balance disable control module 18 utilizes trip signal 1245 to disable current generation module 14 and allow the household outlet 20 to sense the unbalanced current imbalance and, thus, disconnect power at the outlet 20. Switch 182, such as the DG417L IC illustrated, receives trip signal 1245 and disconnects imbalance signal 15 from current generation module 14 in the event the SCR device 124 has been triggered. In order to prevent the switch 182 from reacting ahead of the GFI module 12, a delay circuit 184 may be included to delay the trip signal 1245. Delay circuit 184 may be a resistor and capacitor arranged in series, as illustrated.

Figure 4A:
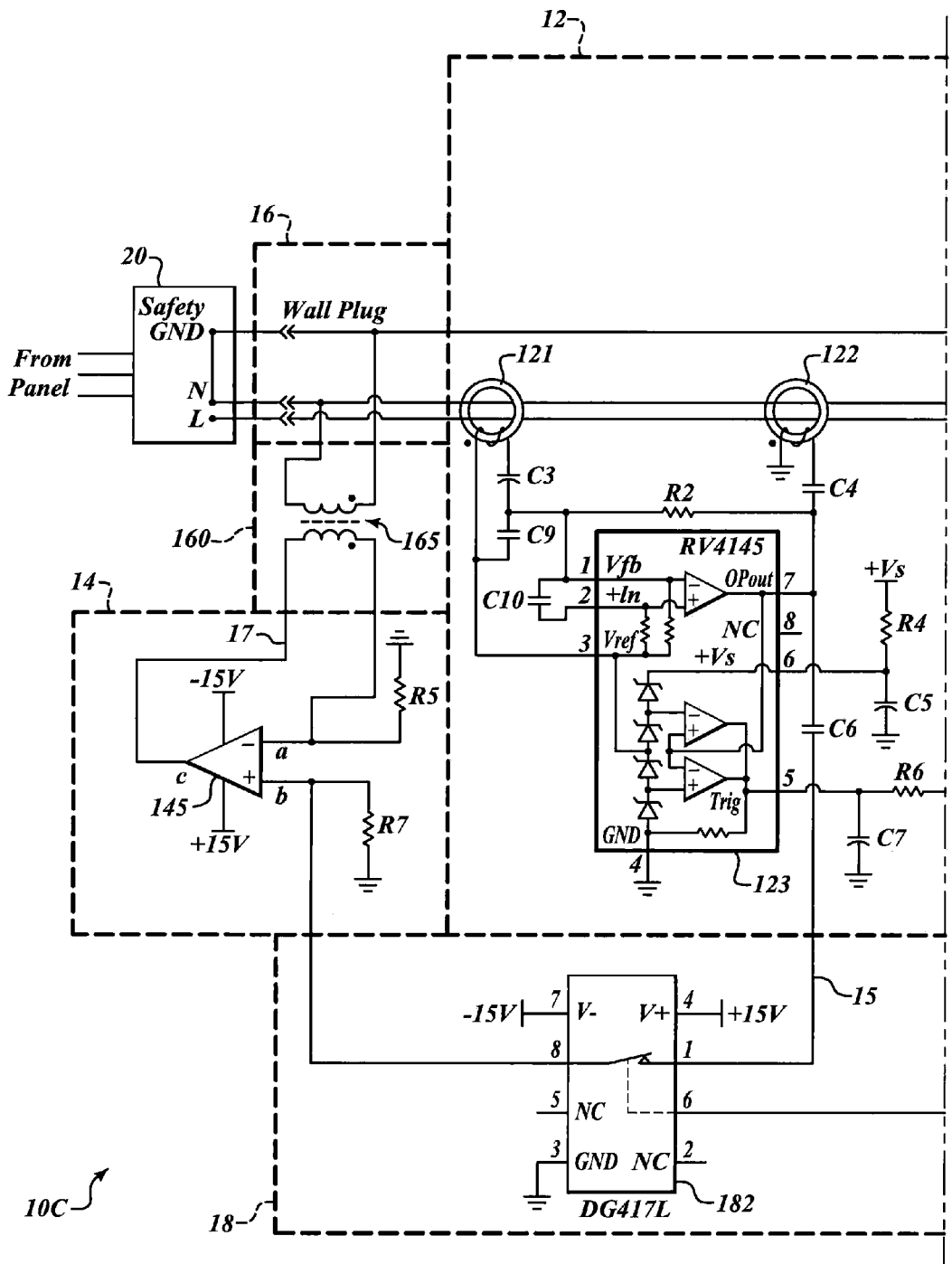
FIGS. 4A-4B illustrate a circuit diagram of an exemplary device for providing a balancing current from a CCID to a GFI to reduce GFI nuisance tripping according to various embodiments of the present disclosure.
Figure 4B:
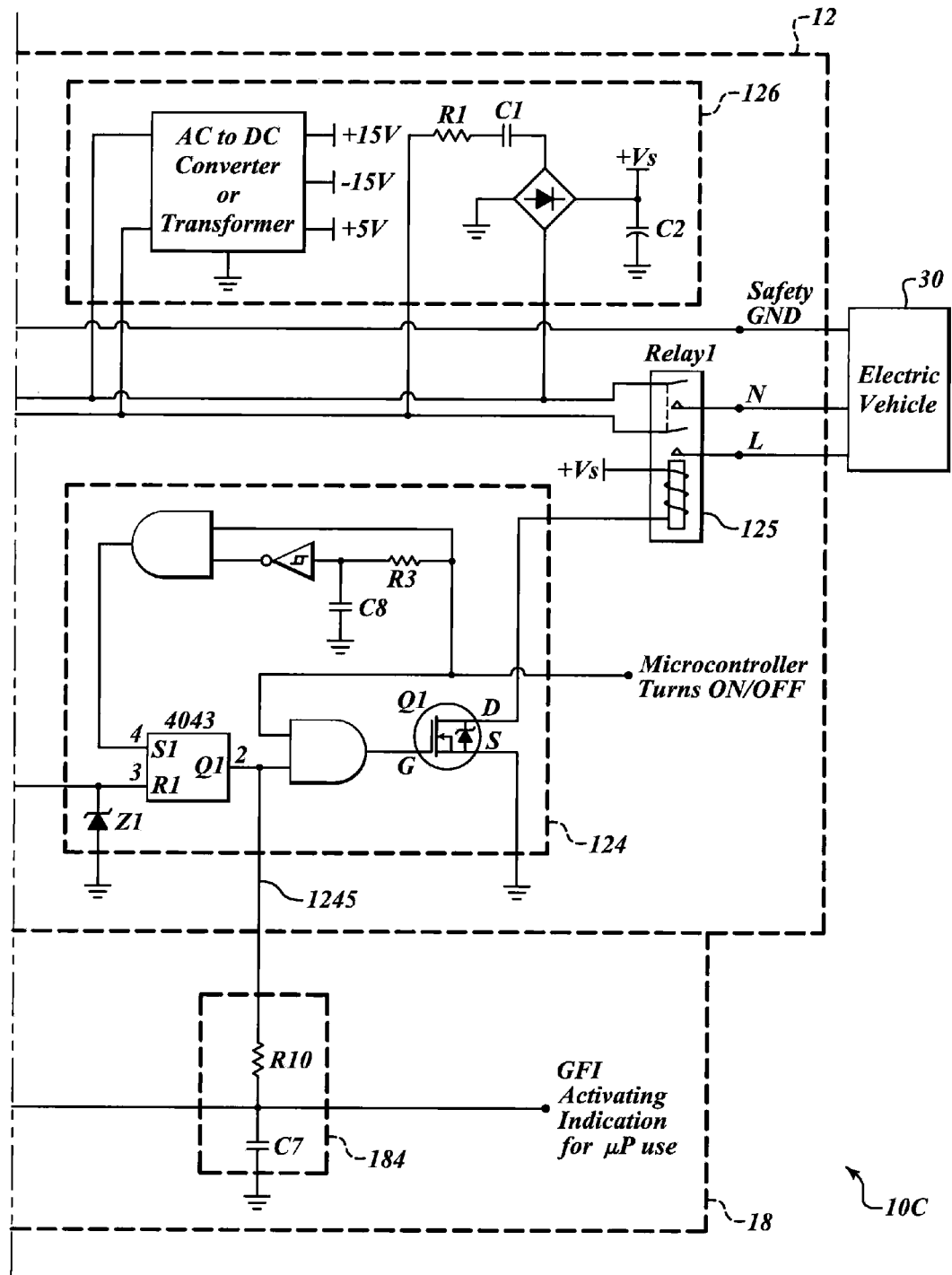

A circuit diagram of yet another exemplary device 10C for providing a balancing current from a CCID to a GFI to reduce GFI nuisance tripping according to various embodiments of the present disclosure is illustrated in FIG. 4. Device 10C is similar to device 10B described above, with the exception of the addition of a current isolation module 160 between the current generation module 14 and current injection module 16. Current isolation module 160 provides isolation between the alternating current of household outlet 20 and the current generation module 14. Current isolation module 160 may include a transformer 165 with one coil connecting the comparator 145 output with the negative input of the comparator 145, and a second coil connecting the N line with the GND line, as illustrated.

Figure 5A:
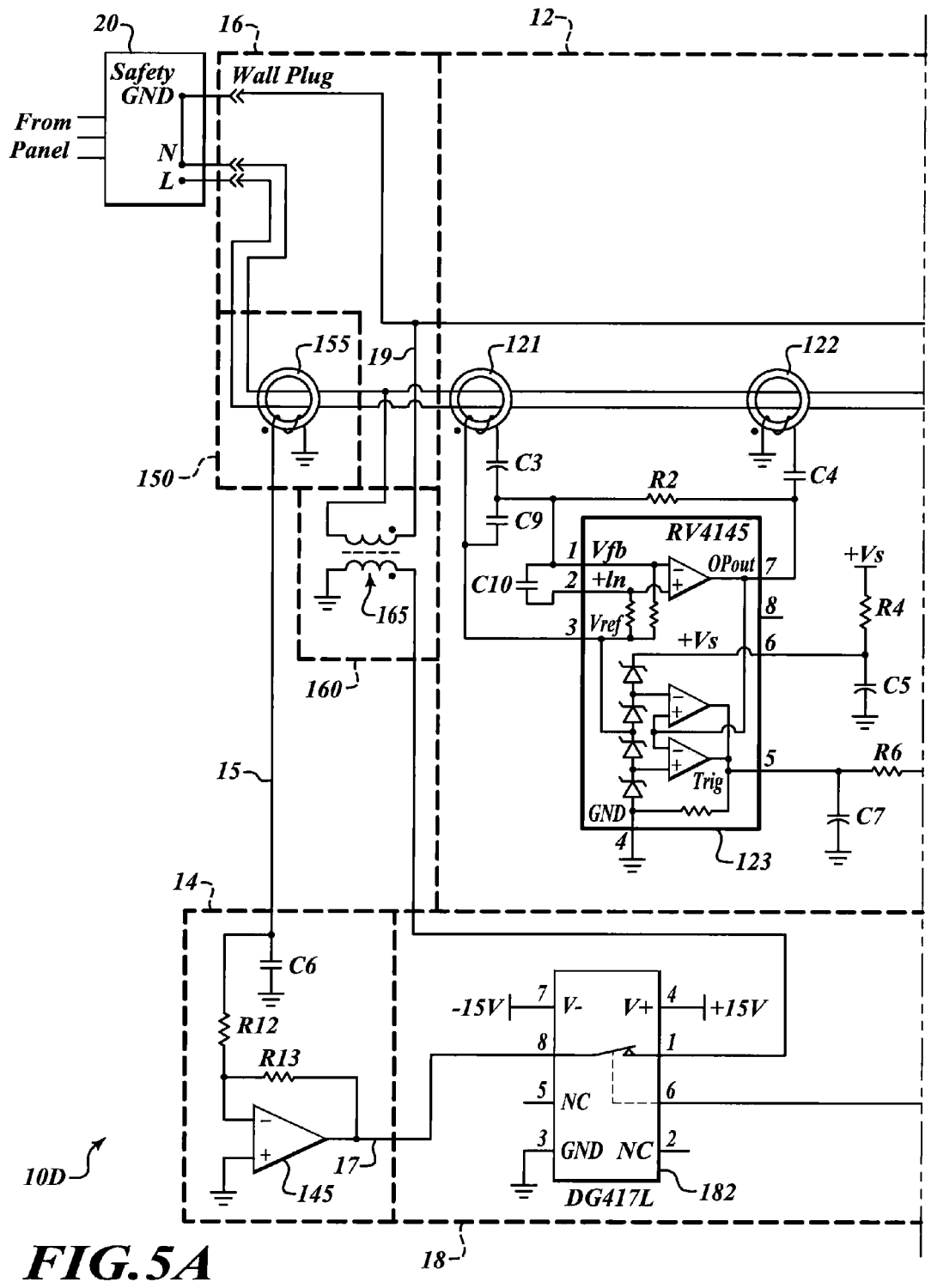
FIGS. 5A-5B illustrate a circuit diagram of an exemplary device for providing a balancing current from a CCID to a GFI to reduce GFI nuisance tripping according to various embodiments of the present disclosure.
Figure 5B:
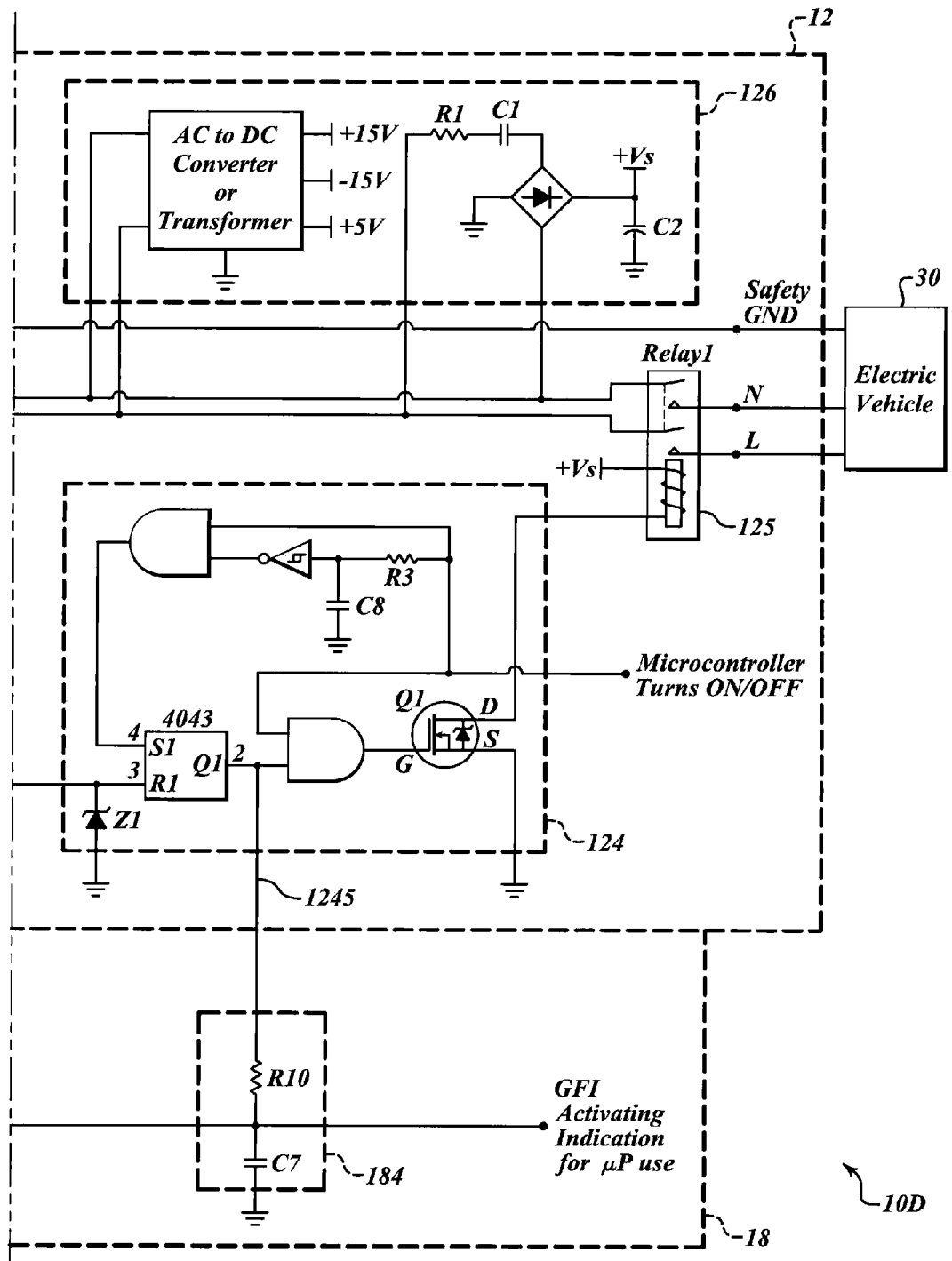

A circuit diagram of yet another exemplary device 10D for providing a balancing current from a CCID to a GFI to reduce GFI nuisance tripping according to various embodiments of the present disclosure is illustrated in FIG. 5. Device 10D is similar to device 10C described above, with the exception of the addition of a sensing module 150 utilized to generate the input to current generation module 14. Device 10D provides a closed-loop input balance circuit with high accuracy and a fast reaction speed. In the previous examples, GFI module 12 output the imbalance signal 15 based on the operation of transformers 121, 122 and low power ground fault interrupter 123. In device 10D, a sensing module 150 is used to sense the current imbalance on the L and N lines and output imbalance signal 15 to current generation module 14 based on the sensed current imbalance. Sensing module 150 may include a sense transformer 155 as illustrated. The remainder of device 10D operates as described above with respect to device 10C.

The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A charge circuit interrupt device, comprising:
a ground fault interrupt module that disconnects a load from a charging source when a current imbalance exceeds a threshold, the charging source comprising a grounded household outlet;
a current generation module that generates a balancing current based on the current imbalance;
a current injection module that inputs the balancing current into the charging source to oppose the current imbalance;
a current isolation module disposed on a load side of the grounded household outlet so that the current isolation module isolates the grounded household outlet and the current generation module, the current isolation module comprising a transformer having a first coil, which connects an output of the comparator with a negative input of the comparator, and a second coil that connects a neutral line with a ground line; and
an input balance disable control module that disables the current generation module from generating the balancing current when the current imbalance exceeds the threshold, wherein the input balance disable control module includes a delay circuit that delays disabling the current generation module from generating the balancing current when the current imbalance exceeds the threshold and wherein the delay circuit comprises a resistor and capacitor arranged in series;
wherein the current generation module comprises a comparator that receives the current imbalance and a ground signal and outputs the balancing current.

2. The device of claim 1, further comprising a current isolation module that isolates the charging source and the ground fault interrupt module, the current generation module and the current injection module.

3. The device of claim 2, further comprising a sensing module for sensing the current imbalance.

4. The device of claim 1, further comprising a sensing module for sensing the current imbalance.

5. The device of claim 4, wherein the sensing module comprises a transformer.

6. The device of claim 1, further comprising a current isolation module that isolates the charging source and the ground fault interrupt module, the current generation module and the current injection module.

7. The device of claim 6, further comprising a sensing module for sensing the current imbalance.

8. The device of claim 7, wherein the sensing module comprises a transformer.

9. The device of claim 1, further comprising a sensing module for sensing the current imbalance.

* * * * *